United States Patent [19]

Heisterkamp et al.

[11] 4,176,155

[45] Nov. 27, 1979

[54] METHOD AND APPARATUS FOR MAKING FILM

[75] Inventors: Herbert W. Heisterkamp, Cleveland; Carl B. Havens, Findlay, both of Ohio

[73] Assignee: The Dow Chemical Company, Midland, Mich.

[21] Appl. No.: 496,493

[22] Filed: Aug. 12, 1974

Related U.S. Application Data

[63] Continuation of Ser. No. 853,615, Aug. 22, 1969, abandoned, which is a continuation of Ser. No. 545,591, Apr. 27, 1966, abandoned.

[51] Int. Cl.² .................. B29D 23/04; B29F 3/08
[52] U.S. Cl. ............................. 264/564; 264/565; 425/72 R; 425/326.1

[58] Field of Search ................ 264/95, 99, 209, 89, 264/564–569; 425/72, 326 R, 72 R, 326.1

[56] References Cited

U.S. PATENT DOCUMENTS

| | | | |
|---|---|---|---|
| 2,987,767 | 6/1961 | Berry et al. | 264/95 |
| 3,170,011 | 2/1965 | Cheney et al. | 264/95 |
| 3,329,999 | 7/1967 | Cook | 18/14 |
| 3,331,901 | 7/1967 | Thomas | 264/95 |

*Primary Examiner*—Jan H. Silbaugh

[57] ABSTRACT

The present invention is concerned with the art of manufacturing film from synthetic thermoplastic resinous materials, and more particularly relates to an improved method and apparatus for the manufacture of thermoplastic resinous film in tubular form.

7 Claims, 3 Drawing Figures

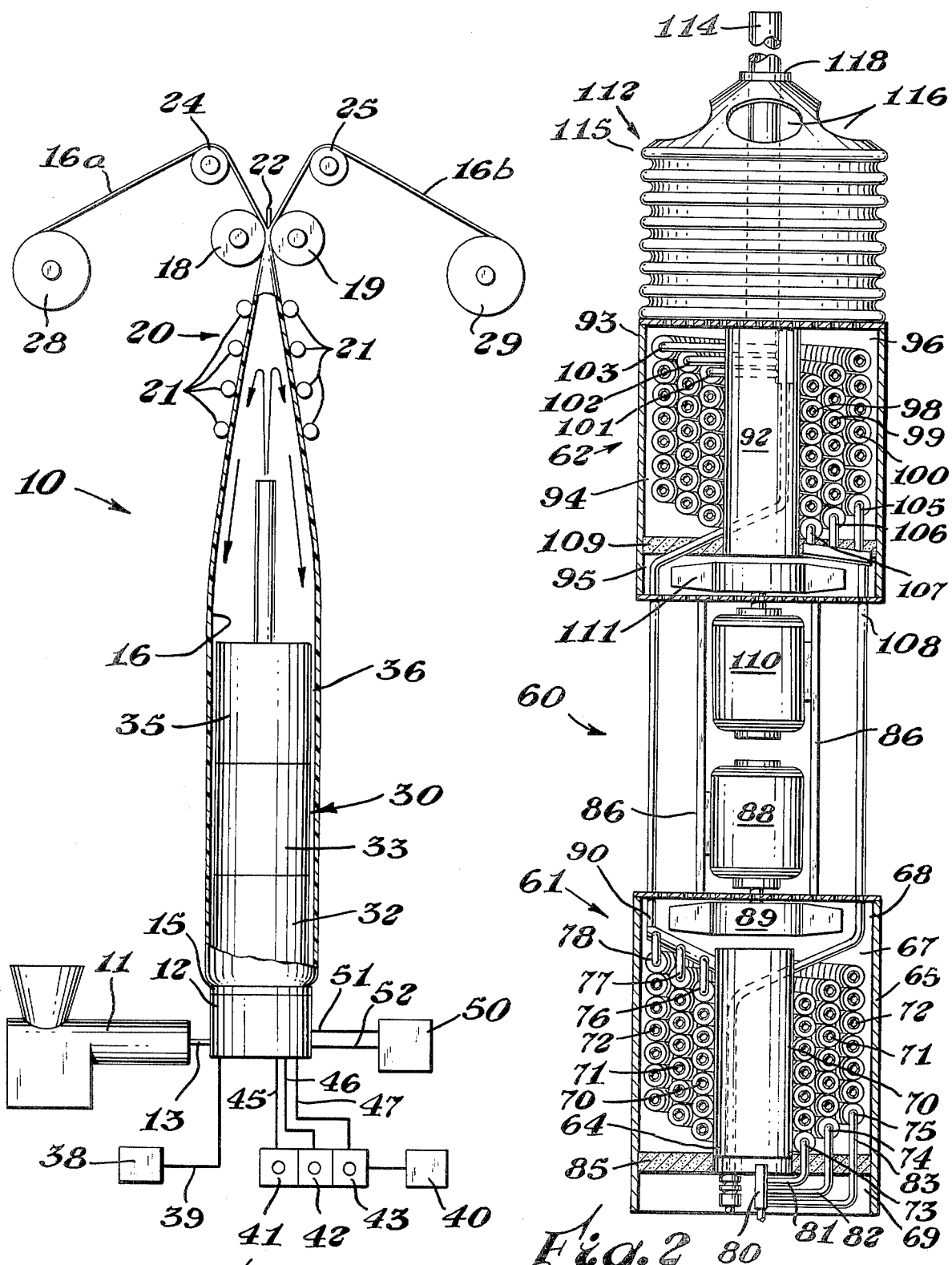

METHOD AND APPARATUS FOR MAKING FILM

This is a continuation of application Ser. No. 853,615, filed Aug. 22, 1969, now abandoned which is a continuation of application Ser. No. 545,591, filed Apr. 27, 1966, now abandoned.

The present invention is especially useful but not restricted to a method and apparatus for the production of film from polymers of non-aromatic or aliphatic hydrocarbon olefins such as polyethylene, polypropylene and the like. Frequently, it is beneficial to manufacture films of many thermoplastic resinous materials in a tubular form. Oftentimes, in such practice, it is desirable and even necessary to orient the freshly extruded film simultaneously with its extrusion by stretching it uniformly throughout the directions of its major dimensions. A beneficial method for accomplishing such orientation utilizes the distending effect of a trapped pocket or bubble of gas which is maintained under pressure within the tubular film in its initial formation. Tubulation processes of this nature are disclosed in U.S. Pat. Nos. 2,461,975 and 2,832,994. Such a process is generally known as the trapped bubble process. In operation of such a trapped bubble process, the synthetic thermoplastic resinous material is extruded from an annular orifice and stretched, cooled and the resultant tube is flattened and passed between a pair of nip rolls. In the extrusion of such a tube, it is essential that the temperature of the tube be reduced below the heat-plastifying temperature of the resin prior to contacting the nip rolls and preferably remote from the nip rolls and generally in the area of the die. A variety of means have been employed to cool the tube of freshly extruded synthetic thermoplastic resinous material. The following patents are generally illustrative of the various techniques and procedures that have been utilized for such cooling: U.S. Pat. Nos. 2,433,937; 2,668,323; 2,668,324; 2,697,852; 2,844,846; 3,170,011; and British Pat. No. 828,851. In the preparation of synthetic thermoplastic resinous materials by the trapped bubble process, it is desirable, on a commercial basis, that for a given size of extruder or die, that maximum production be achieved; that is, a relatively high number of pounds per hour of film be produced. This is particularly advantageous when a relatively high production rate may be achieved from a relatively small extruder. Furthermore, in the production of film by the trapped bubble process, great effort has been put forth to construct dies in such a manner that a relatively uniform tube is produced. However, cooling must be accomplished in the uniform manner particularly when the tube is oriented or stretched by means of the internal gas bubble. Thus, in cooling an extruded tube, it is essential that cooling be accomplished uniformly and in order to provide high production rates from equipment, relatively large quantities of heat must be removed. The technique set forth in U.S. Pat. No. 3,170,011 accomplishes relatively uniform cooling, but suffers from a lack of potential cooling capacity.

It would be beneficial and advantageous if there were available an improved method and apparatus for the preparation of synthetic resinous thermoplastic film by the trapped bubble process which permitted high production rates and a high cooling capacity.

It would be further advantageous if there were available an improved method and apparatus for the manufacture of film tubes of polyethylene and polypropylene by the trapped bubble process.

It would also be advantageous if there were available an improved method and apparatus for operation in general accordance with the trapped bubble process in which close and accurate temperature control and efficacious cooling and shaping of the freshly extruded film product prior to or simultaneously with stretching is readily achieved upon and in the tubular extrude.

It would also be advantageous if there were available a method and apparatus for the production of synthetic resinous tubular film which would permit relatively high production rates from tubular extruders.

These benefits and other advantages in accordance with the present invention are achieved in a method for the production of a thermoplastic resinous film which comprises extruding a fused thermoplastic film-forming resin through a generally annular extruding orifice in a tube die in the form on a seamless film tube, withdrawing the freshly extruded film away from the die and radially expanding the film tube over a trapped gas bubble, flattening the expanded film tube with flattening means positioned at a distance from the die, continuously applying to the exterior surface of the tube immediately after its extrusion and prior to its being expanded to its maximum diameter a circum-enveloping gaseous coolant stream at a temperature beneath the temperature of the freshly extruded film, supplying a liquid coolant to the interior of the trapped bubble, passing a gaseous heat-exchange medium over the liquid coolant, directing the gaseous heat-exchange medium at the internal surface of the bubble in a substantially uniform manner through a rotating generally annular nozzle at a velocity of from about 1000 to about 4000 feet per minute and a volume of 50 to 200 cubic feet per minute per lineal inch of tube diameter at the extrusion orifice, and subsequently exhausting the liquid coolant from the bubble while maintaining the liquid coolant and the gaseous heat-exchange medium in non-contacting manner.

The method of the invention is advantageously practiced employing the apparatus of the invention which comprises in cooperative combination a tube die adapted to extrude a seamless film tube, flattening means positioned a distance from the die for flattening the freshly extruded tube, the die having disposed therein an inlet conduit and an outlet conduit passing therethrough from without and into the space that is enveloped by the freshly extruded tube, a liquid-gas heat-exchanger supported by the die and in communication with the inlet and outlet conduits, and means to move a gaseous coolant over the heat-exchanger in a symmetrical pattern which is symmetrical about the axis of the die and freshly extruded tube, the means to move the heat-exchange gas being so constructed and arranged that motion of the gas is symmetrical about the axis of the die.

Further features and advantages of the present invention will become more apparent from the following specification when taken in connection with the drawing wherein:

FIG. 1 schematically illustrates the method and apparatus of the invention.

FIG. 2 is a schematic representation of a cooler assembly.

Figure 3:
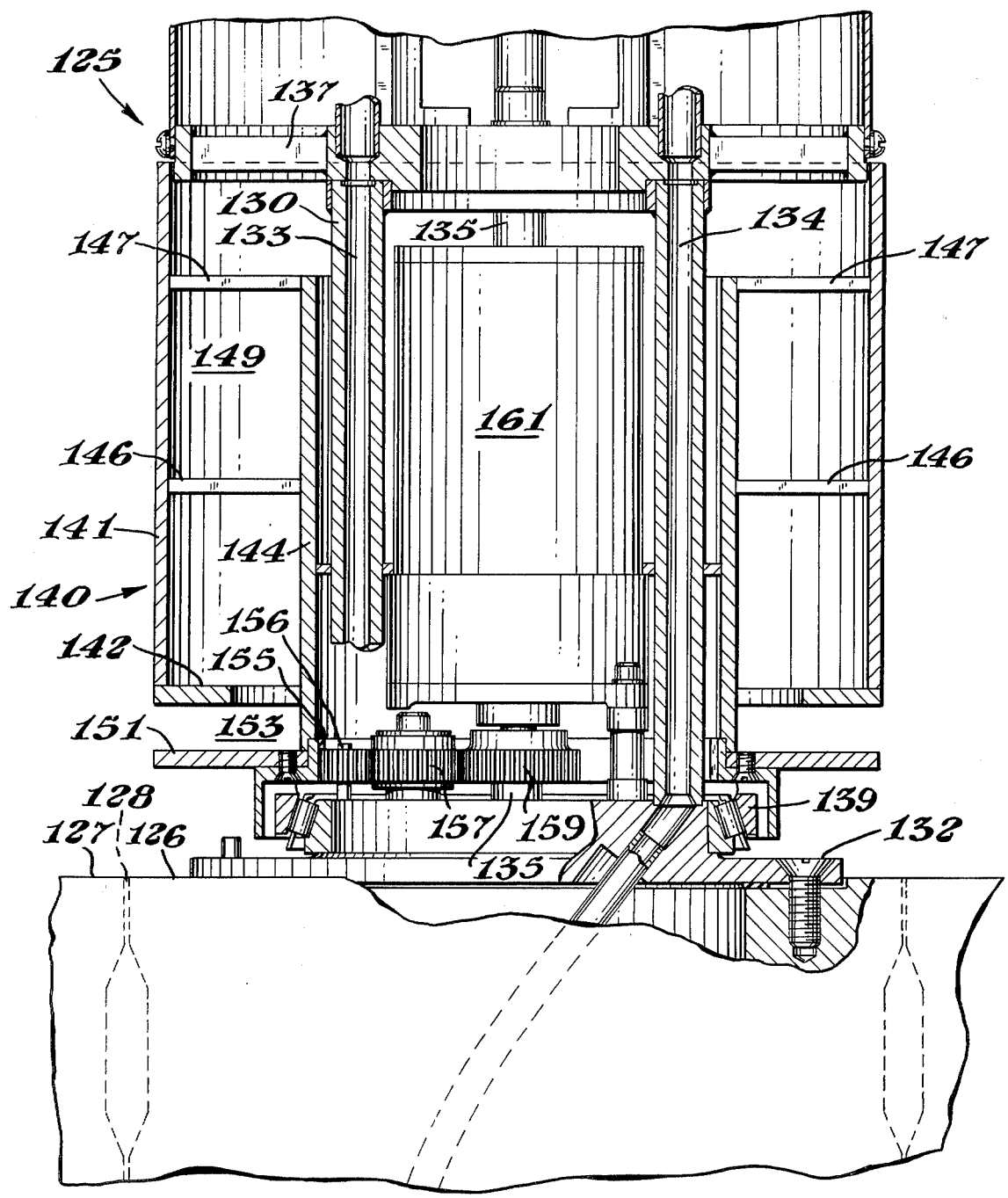
FIG. 3 is a sectional representation of a distributor assembly.

In FIG. 1 there is illustrated a film generating apparatus generally designated by the reference numeral 10. The apparatus 10 comprises in cooperative combination a source of heat-plastified synthetic resinous thermoplastic material or an extruder 11. The discharge of the extruder 11 is in operative combination with a tubing die 12 by means of a conduit 13. The tubing die 12 defines an annular extrusion orifice not shown which is in operative communication with the conduit 13. An external air ring or housing 15 is disposed about the annular extrusion orifice immediately adjacent the die 12. The annular air ring 15 is adapted to supply a circumferential inwardly flowing stream of cooling gas to the external surface of a tube or bubble 16 emerging from the annular extrusion orifice. A pair of nip rolls 18 and 19 are generally positioned on the center line of extrusion and disposed remotely from the extrusion orifice. A collapsing assembly generally designated by the reference numeral 20 is disposed generally adjacent the nip rolls 18 and 19. The collapsing assembly comprises a plurality of rolls 21. The rolls 21 are arranged in two opposed generally parallel sets which converge toward the nip of the nip rolls 18 and 19 and diverge toward the die 12. A pair of slitting devices 22 are disposed adjacent the nip rolls 18 and 19 and adapted to engage the edge portions of the flattened bubble 16 to provide sheets 16a and 16b. A pair of rolls 24 and 25 are disposed generally adjacent and parallel to the nip rolls 18 and 19. The rolls 24 and 25 are disposed remotely from the die 12 and serve to support the sheets 16a and 16b slit from the collapsed bubble. The sheets 16a and 16b are wound onto mill rolls 28 and 29. The bubble 16 is maintained in the distended form by means of internal gas pressure. Disposed within the bubble and secured to the die 12 is a cooling assembly generally designated by the numeral 30. The cooling assembly 30 comprises a support and distributor 32. A first cooler assembly affixed to the support and distributor 32, and a second cooler assembly 35 secured to the first cooler assembly 33 in a location remote from the die 12. The support and distributor 32 and the cooling assemblies 33 and 35 are generally coaxially disposed with relation to the annular die opening and are axially disposed within the bubble 16. The distributor 32 and cooling assemblies 33 and 35 are adapted to circulate a gas within a space 36 defined by the bubble 16. A gas source 38 is in operative communication with the space 36 by means of a conduit 39 and a passageway not shown within the die 12. A power source 40 is in operative communication with first, second and third power control means 41, 42 and 43, respectively. The power control means 41, 42 and 43 are in operative communication with motors disposed within the distributor 32 and the cooling assemblies 33 and 35, respectively, by means of the lines 45, 46 and 47 passing through the die 12 by means of a passageway not shown. A liquid refrigerant source 50 is in operative communication with the cooling assemblies 33 and 35 by means of an inlet line 51 and an outline line 52.

In operation of the apparatus illustrated in FIG. 1, heat plastified synthetic resinous material is provided by the extruder 11 to the die 12 by means of the conduit 13. The heat plastified material is extruded from the die in the form of a tube 16. The tube 16 passes to the nip rolls 18 and 19. A suitable gas such as air is introduced from the gas source 38 by means of the conduit 39 into the space 36 to provide sufficient pressure within the bubble 16 to distend or stretch the bubble to a desired degree. The distended bubble is collapsed by the means of the collapsing assembly 20 to provide a flattened tube which is subsequently slit to provide the sheets 16a and 16b. Refrigerant is circulated within the cooling assemblies 33 and 35 by the refrigerant source 50. Blowers (not shown) disposed within the cooling assemblies 33 and 35 cause the gas within the bubble to flow in a generally annular vortical flow pattern generally adjacent each of the cooling assemblies. The distributor 32 rotates generally above the axis of extrusion and the air ring 15 supplies cooling air to the external surface of the bubble generally adjacent the die. By the term "annular vortical flow" is meant a flow pattern having an annular configuration wherein the major direction of flow is about the periphery of a cross-section of an annulus, the cross-section being taken in a plane which contains the axis of generation of the annulus.

In FIG. 2 there is illustrated a pair of cooling assemblies generally designated by the reference numeral 60. The cooling assemblies 60 comprise a first cooling assembly 61 and a second or terminal cooling assembly 62. The first cooling assembly 61 comprises a frame and support or mandrel 64. The mandrel 64 is generally centrally located and of cylindrical configuration. The support or mandrel 64 is adapted to be supported by a distributor and support assembly such as the support assembly 32 of FIG. 1. Coaxially disposed about the mandrel 64 is an outer housing 65 also of a generally hollow cylindrical configuration. The mandrel 64 and housing 65 define an internal annular space 67 having a first end 68 and a second end 69. A plurality of finned tube heat exchange elements 70, 71 and 72 are helically disposed within the annular space 67. The heat exchange elements 70, 71 and 72 have first ends 73, 74 and 75, respectively. A refrigeration header 80 is in communication with the first ends 73, 74 and 75 of the heat exchange elements or tubes 70, 71 and 72 by means of the conduits 81, 82 and 83, respectively. A filter 85 is disposed within the annular passageway 67 generally adjacent the second end 69 thereof. A frame 86 is disposed in generally coaxial relationship with the external member 65 and adjacent the first end 68. The frame 86 is of perforate construction and supports a motor 88 having an air forwarding means or impeller 89 adapted to move gas through the annular passageway 67 and over the heat exchange elements 70, 71 and 72. Refrigerant line 90 is in operative communication with the second ends 76, 77 and 78 of the heat exchange elements 70, 71 and 72, respectively.

The frame 86 serves to rigidly secure the first cooling assembly 61 to the second cooling assembly 62 which is disposed in generally coaxial relationship thereto.

The second cooling assembly 62 comprises a generally cylindrical support or mandrel 92 secured to the frame 86. About the mandrel 92 is supported a cylindrical housing 93 which is coaxially arranged with respect to the mandrel 92. The housing 93 and mandrel 92 define an annular passageway 94 having a first end 95 and a second end 96. A plurality of helically disposed finned tube heat exchange elements 98, 99 and 100 are disposed within the annular space 94. The heat exchange elements 98, 99 and 100 have first ends 101, 102 and 103, respectively. The first ends 101, 102 and 103 are in operative communication with the conduit 90 which passes within the mandrel 92. The heat exchange elements 98, 99 and 100 have second ends 105, 106 and 107, respectively. The second ends 105, 106 and 107 are in operative communication with a conduit 108, which passes along the frame 86 through the first cooling assembly 61 and communicates with a refrigerant discharge line not shown. A gas filter 109 is disposed within the first end 95 of the annular passageway 94. A motor 110 is affixed to the frame 86 and an impeller 111 is in operative connection with the motor 110 and is adapted to move gas through the annular passageway 94 and over the heat exchange elements 98, 99 and 100. A terminal distributor 112 is affixed to the cooling assembly 62 and communicates with the second end 96 of the internal passageway 94. The terminal distributor 112 comprises a generally centrally disposed support member 114 and a flexible corrugated conduit 115 affixed to the housing 93 and terminating remotely therefrom in a plurality of apertures 116, generally symmetrically disposed about the support 114. The conduit 115 remote from the housing 93 is adjustably secured to the mandrel 114 by means of the ring or securing means 118.

In operation of the cooling portion depicted in FIG. 2, a refrigerant is supplied to the header 80 which causes the refrigerant to flow through the heat exchange elements 70, 71 and 72 and discharge into the line 90 which in turn supplies a refrigerant or heat exchange fluid to the finned tube elements 98, 99 and 100 of the second cooling assembly 62. The heat exchange liquid or refrigerant is discharged through line 108 and returned to the supply source. The impellers 89 and 111 force gas through the annular passageways 67 and 94, and when the cooling assemblies are disposed within a surrounding tubular enclosure such as is provided by the film bubble 16 of FIG. 1, each of the cooling assemblies provides an annular vortical flow pattern.

In FIG. 3 there is illustrated a view of a support and distributing assembly supported upon a die. The support and distributor assembly is designated by the reference numeral 125. The assembly 125 is rigidly affixed to a face 126 of an annular extrusion die 127 having an annular extrusion orifice 128. The assembly 125 comprises in cooperative combination a frame 130. The frame 130 is rigidly affixed to the die face 126 by means of the bolts 132. The frame 130 defines a first refrigerant passageway 133 and a second refrigerant passageway 134. A conduit 135 is adapted to pass a plurality of electrical current conducting members from the die face to the portion of the frame remote from the die portion 135 adapted to support a cooling assembly such as the cooling assembly 60 of FIG. 2. A bearing 139 is generally circumferentially disposed about the frame 130 generally adjacent the die face 126. The bearing 139 rotatably supports a generally cylindrical distributor 140. The distributor 140 comprises a generally annular outer housing 141. The outer housing 141 defines an inwardly projecting annular flange 142 disposed generally adjacent the bearing 139. An inner housing 144 is disposed about the central portion of the frame 130. The housing 144 has a generally annular configuration and is affixed to the outer housing 141 by means of a first plurality of arms 146 and a second plurality of arms 147. The inner housing 144 and the outer housing 141 defines the generally annular passageway 149. The housing 144 has a generally outwardly extending flange or lip 151 disposed generally adjacent the bearing 139 and in spaced relationship to the flange 142 of the outer housing 141. A generally radially extending passage 153 is defined by the flanges 142 and 151 and the inner housing 144. The passageway 153 is in communication with the passageway 149. Generally adjacent the bearing 139 and within the housing 144 is disposed a ring gear 155. The ring gear 155 is in operative engagement with a first idler gear 156 rotatably mounted upon the housing 130. The first idler gear 156 is in operative engagement with a second idler gear 157 which is rotatably mounted to the housing 130. A pinion gear 159 is in operative engagement with the second idler gear 157. The pinion gear is driven by a gear head motor 161 mounted within the housing 130. The gear head motor 161 is beneficially of the variable speed variety. The distributor depicted in FIG. 3 is particularly adapted for use with an extrusion apparatus designed to extrude vertically upward. Modification of the bearing 139 will permit operation in any desired plane. The gear head motor rotates the distributor formed by the inner plane. The gear head motor rotates the distributor formed by the inner and outer housing 144 and 141, respectively, which provides a generally uniform distribution of air or other coolant gas entering from a cooling means such as the cooling means 61 of FIG. 2. The cooling gas enters through the spider or terminal end 137 of the frame 130, passes into the passage 149 and through the annular outwardly extending passage 153. While the distributor 140 at the rate such as 135 rpm for a 12 inch die (a die whose annular extrusion orifice is about 12 inches in diameter) provides a sufficient distribution of minor irregularities in the air flow but the resultant film extruded therefrom is commercially uniform in thickness when disposed on the mill roll.

Essential to the practice of the method of the present invention is the use of a liquid heat exchange media entering the die. This permits internal cooling of the film at a much higher rate than can be obtained by passing a refrigerant gas into the film bubble and exhausting the gas for cooling and recirculation within the bubble.

Beneficially, annular vertical flow of the heat exchange gas within the bubble provides uniform rapid cooling thereof and most beneficially adjacent the die employed concurrent annular vertical flow as depicted by the arrows of FIG. 1. The concurrent flow provides exceptional uniformity because of the ability to provide a rotational randomizing flow about the orifice of the bubble adjacent the die face where the thermoplastic material of the bubble is in its most fluid state and is most subject to the formation of irregularities due to uneven temperatures.

Advantageously, the addition of a second cooling section significantly increases the cooling capacity and the annular vortical flow pattern of the second cooling means is beneficially opposite to that of the first cooling means adjacent the die. In most film extrusion operations, it is highly desirable to incorporate within the cooling sections a filter or like collector means to remove any condensate which may arise from volatile materials escaping from the extruded plastic melt. For example, extremely small quantities of water within the plastic melt can result in the eventual accumulation of sufficient water within the bubble that water condenses on the cooling elements and impinges upon the die face of the housing adjacent the die face and results in non-uniform temperature of the die. Such condensate also may drip onto the internal surface of the bubble if the extrusion is conducted in other than a vertical upward manner. Internal coolers in accordance with the present invention generally permit an increase in extrusion rate of from about 2 to 3 times the rate of extrusion obtainable without the coolers. Such extrusion rates cannot be obtained by employing transfer of cooling gas from a source external to the bubble. Control of the gas streams at the required flow velocity and pressures appear to be commercially impractical.

Shaping of the bubble in the cooling zone adjacent the die orifice is readily achieved by control of the air velocity and mass of air delivered by the outward annular discharge adjacent the die. Such shaping allows rapid or gradual stretching of the extruded tube depending upon the particular product being prepared.

Beneficially, in order to provide suitable shaping and cooling of the extruded bubble, particularly when extruding the polyolefins, it is essential and critical that the air velocity provided by the distributor or annular discharger be within the range of 1000 to 4000 feet per minute and the volume be from about 50 cubic feet per minute to 200 cubic feet per minute per linear inch of circumference of the extrusion die. The annular air blast must be applied at the die face or at a distance not greater than about 2.5 inches above or away from the die lips and preferably at a distance of about 1¼ inches therefrom. In order that the bubble or extruded tube be properly cooled and shaped by the high velocity air blast, it is necessary that the diameter of the annular discharge means such as the components defining the annular passage 153 of FIG. 3 have a diameter of from about 0 to about 2 inches less than the die lip diameter, and preferably, a dimension of about 1 inch less in diameter than the diameter of the extrusion orifice. It is essential and critical that the distributor such as the distributor 140 or the housing immediately adjacent the annular lips have a configuration roughly equal in size to the configuration defining the outwardly facing annular discharge opening in order to prevent a venturi effect and cause a decrease in diameter of the bubble.

Employing the method of the present invention, it is possible to prepare polyethylene film having desired properties and to maximize certain desired properties depending on end use of the film. Utilizing a method of the present invention, in all cases bag and sag or lay flat characteristics of the film are significantly improved and such features as gloss and clarity and impact strength are significantly affected by varying the air velocity and volume.

By way of further illustration, polyethylene having a melt index of 3 is extruded at a rate of about 200 pounds per hour from a die having a diameter of 12 inches and a die temperature of 350° F. The die is equipped with a cooler substantially as depicted in FIG. 3 and an annular distributing means substantially as depicted in FIG. 3. The radially outwardly extending nozzle had a diameter of 11 inches and rotated at a speed of 14.6 rpm.

The results of several experiments are set forth in the following table.

TABLE I

| Sample No. | Extrusion Rate #/Hr | Windup Speed FPM of Resultant Film | Frost-line Height Inches | Outer Air Ring Volume[1] | Inner Cooler Condition | Gloss[2] |
|---|---|---|---|---|---|---|
| 1 | 132 | 46 | 15 | 460 cu FPM at lin. velocity of 2350 FPM | Off | 67 |
| 2 | 132 | 46 | 15 | 0 | 245 cu FPM at linear velocity of 1800 FPM | 72 |
| 3 | 200 | 70 | 18.5 | 680 cu FPM at lin. velocity of 3300 FPM | Off | 74 |
| 4 | 200 | 70 | 18.5 | 318 cu FPM at lin. velocity of 1600 FPM | 200 cu FPM at linear velocity of 1500 FPM | 78 |
| 5 | 200 | 70 | 15 | 680 cu FPM at lin. velocity of 330 FPM | 200 cu FPM at linear velocity of 1500 FPM | 72 |

| Sample No. | Haze[3] | Gardner See Thru Clarity[4] | Dart Impact Grams[5] | Bag[6] | Remarks |
|---|---|---|---|---|---|
| 1 | 5.6 | 8 | 84 | ¾" | |
| 2 | 5.6 | 42 | 87 | ⅛" | Control of bubble shape improves gloss, impact, see thru clarity |
| 3 | 4.7 | 14 | 91 | 1" | Film blocks and is baggy* |
| 4 | 3.6 | 27 | 80 | ⅛" | Control of bubble shape improves gloss, haze and see thru clarity; film is not blocked and is flat** |
| 5 | 4.2 | 14 | 107 | ⅛" | Modifies bubble shape and improves impact strength 107 gms. v. 91 gms. |

TABLE I-continued for Sample No. 3

FOOTNOTES TO TABLE I:
[1]Outer air ring the diameter of 12.25 inches to form an annular inwardly facing slot 0.60 inch in width
[2]45° Specular gloss American Society for Testing Materials D-1471-57 T
[3]American Society for Testing Materials D-1003-61
[4]American Society for Testing Materials D-1746-62 T
[5]American Society for Testing Materials D-1709-62 T
[6]Difference in length between one inch strips severed from the machine direction of the film
*About 1 inch bag per foot of width for a 5 foot length
**About ⅛ inch bag per foot of width for a 5 foot length While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

What is claimed is:

1. Apparatus for the production of thermoplastic seamless tube comprising an extrusion head having an annular extrusion orifice and means centrally located adjacent said extrusion head for cooling and radially directing cooling gas against the internal surface of continuously extruded thermoplastic tubing said means for cooling and radially directing cooling gas comprising a stationary housing having an elongated chamber therein, said chamber extending in an axial direction with respect to said annular extrusion orifice and having an inlet for the cooling gas at the end opposite said extrusion orifice, means for directing a stream of cooling gas from said inlet through said chamber, cooling means in said chamber for cooling said stream of gas as it passes therethrough, and nozzle means between said stationary housing and said extrusion head, said nozzle means comprising a second housing which is rotatably mounted, said rotatable housing having a further chamber therein having an inlet at one end thereof for receiving said cooling gas from said stationary housing and an annular substantially radially directed outlet passage, said outlet passage being unobstructed whereby upon rotation of said second housing a uniform omni-radial stream of cooling gas is directed against the interior surface of the extruded tube and along a path away from said extrusion head and contiguous to the interior surface of the extruded tube towards said inlet in said chamber of said stationary housing.

2. Apparatus as claimed in claim 1 wherein said cooling means comprises an elongated cooling element extending in an axial direction within the chamber of said stationary housing.

3. In a method for producing a thermoplastic seamless tube, the steps comprising
   continuously extruding thermoplastic material in the form of seamless tubing,
   continuously withdrawing the tubing from the point of extrusion,
   directing a cooling gas stream through the extruded tubing in an axial direction opposite to the direction of withdrawal of said tubing towards the point of extrusion,
   imparting a helical motion to said stream as said stream moves in said axial direction, and then
   directing said stream having a helical flow pattern radially along a path against the interior surface of said tubing and away from said point of extrusion to cool the tubing.

4. The method for producing a thermoplastic seamless tube comprising the steps of
   continuously extruding thermoplastic material in the form of seamless tubing,
   continuously withdrawing the tubing from the point of extrusion,
   imparting the helical motion to a cooling gas stream while passing said gas stream in an axial direction toward said point of extrusion, and then
   directing said stream having a helical flow pattern radially against the inner surface of said tubing and in the direction of extrusion of said tubing to cool the tubing.

5. A method as claimed in claim 4 wherein said helical motion is imparted to said cooling gas stream while being directed in an axial direction through the extruded tubing towards the point of extrusion.

6. A method as claimed in claim 4 wherein said cooling gas stream is directed radially towards the interior surface of said tubing between continuously rotating surfaces, the space between said surfaces through which said stream passes being unobstructed, whereby a uniform omni-radial stream of cooling gas is generated.

7. A method as claimed in claim 4 wherein said cooling gas stream is drawn away from the interior surface of said tubing and cooled.

* * * * *